(12) United States Patent
Lewis et al.

(10) Patent No.: US 9,459,754 B2
(45) Date of Patent: Oct. 4, 2016

(54) INTERACTIVE ORAL PRESENTATION DISPLAY SYSTEM

(75) Inventors: Jeffrey S. Lewis, Fort Collins, CO (US); Michael Jackowski, Aurora, CO (US); Robert J. Fiesthumel, Fort Collins, CO (US); Marna Deines, Brighton, CO (US)

(73) Assignee: eduPresent, LLC, Fort Collins, CO (US)

( * ) Notice: Subject to any disclaimer, the term of this patent is extended or adjusted under 35 U.S.C. 154(b) by 24 days.

(21) Appl. No.: 13/823,460

(22) PCT Filed: Oct. 27, 2011

(86) PCT No.: PCT/US2011/001820
§ 371 (c)(1),
(2), (4) Date: Mar. 14, 2013

(87) PCT Pub. No.: WO2012/057835
PCT Pub. Date: May 3, 2012

(65) Prior Publication Data
US 2013/0298025 A1 Nov. 7, 2013

Related U.S. Application Data

(60) Provisional application No. 61/441,670, filed on Feb. 11, 2011, provisional application No. 61/407,548, filed on Oct. 28, 2010.

(51) Int. Cl.
*G06F 3/048* (2013.01)
*G09B 5/00* (2006.01)
*G09B 5/06* (2006.01)
*G09B 7/02* (2006.01)

(52) U.S. Cl.
CPC .................. *G06F 3/048* (2013.01); *G09B 5/00* (2013.01); *G09B 5/06* (2013.01); *G09B 7/02* (2013.01)

(58) Field of Classification Search
CPC ...................... G06F 9/45512; G06F 17/30056
See application file for complete search history.

(56) References Cited

U.S. PATENT DOCUMENTS

| 5,764,901 A | 6/1998 | Skarbo et al. |
| 6,154,631 A | 11/2000 | Remschel |
| 6,471,521 B1 | 10/2002 | Dornbush et al. |

(Continued)

FOREIGN PATENT DOCUMENTS

WO 2013/188290 12/2013

OTHER PUBLICATIONS

Provisional U.S. Appl. No. 61/407,548, filed Oct. 28, 2010.
(Continued)

*Primary Examiner* — Matthew Ell
*Assistant Examiner* — Mohamed Abou El Seoud
(74) *Attorney, Agent, or Firm* — Craig R. Miles; CR Miles P.C.

(57) ABSTRACT

A computer implemented interactive oral presentation display system provides server computers allowing one or more client devices and one or more administrator devices access to an oral presentation display application which provides client user interfaces having a first image display area and a second image display area concurrently displayed on a display surface allowing the client user to control presentation of streaming media in the first image display area and selection of one or more images for serial display in the second image display area, each of which can be coupled in timed synchronized relation with the streaming media.

19 Claims, 10 Drawing Sheets

(56) References Cited

U.S. PATENT DOCUMENTS

| | | | |
|---|---|---|---|
| 7,506,262 B2 | 3/2009 | Gupta et al. | |
| 7,908,602 B2 | 3/2011 | Alcorn | |
| 8,140,973 B2* | 3/2012 | Sandquist | G06F 17/30781 704/270 |
| 8,640,030 B2* | 1/2014 | Kulas | G06F 17/30056 715/723 |
| 8,806,320 B1* | 8/2014 | Abdo | G06F 17/30017 715/203 |
| 2002/0105598 A1 | 8/2002 | Tai et al. | |
| 2002/0115051 A1 | 8/2002 | Sanda | |
| 2003/0073064 A1 | 4/2003 | Riggs | |
| 2003/0174160 A1* | 9/2003 | Deutscher et al. | 345/716 |
| 2004/0143630 A1 | 7/2004 | Kaufmann et al. | |
| 2004/0153504 A1 | 8/2004 | Hutchinson | |
| 2005/0081159 A1* | 4/2005 | Gupta et al. | 715/751 |
| 2006/0111902 A1 | 5/2006 | Julia et al. | |
| 2007/0074116 A1* | 3/2007 | Thomas | 715/719 |
| 2008/0254425 A1 | 10/2008 | Cohen | |
| 2009/0164904 A1* | 6/2009 | Horowitz | G06F 17/30817 715/723 |
| 2010/0153850 A1 | 6/2010 | Hariton | |
| 2010/0251177 A1 | 9/2010 | Geppert et al. | |
| 2010/0274847 A1 | 10/2010 | Anderson et al. | |
| 2011/0026898 A1 | 2/2011 | Lussier et al. | |
| 2012/0036423 A1 | 2/2012 | Haynes et al. | |

OTHER PUBLICATIONS

Provisional U.S. Appl. No. 61/441,670, filed Feb. 11, 2011.
International Patent Cooperation Treaty Patent Application No. PCT/US2011/001820, filed Oct. 27, 2011.
Provisional U.S. Appl. No. 61/658,298, filed Jun. 11, 2012.
Apple iPhone User Guide for iOS 4.2 Software; Copyright 2010, 5 total pages (excerpt).
PCT International Patent Application No. PCT/US15/14493; International Search Report and Written Opinion mailed May 14, 2015, 14 pages total.
ZeeBigBang. FORscene Tutorial (full). Vimeo. N.p., Oct. 14, 2010. Website, https://vimeo.com/15836683, originally downloaded Sep. 1, 2015, 1 page.
Apple. iPhone User Guide for iOS 4.2 Software; Copyright 2010, 5 total pages (excerpt).
Corresponding U.S. Appl. No. 13/842,846; Office Action mailed Dec. 31, 2014.
U.S. Appl. No. 14/480,509, filed Sep. 8, 2014.

* cited by examiner

FIG. 7

| Assignments & My Video | | | | | | | | |
|---|---|---|---|---|---|---|---|---|
| ◉ Video state ⬍ | ◉ Assignment (due date) | ◉ Video (date submitted) | ◉ Slides | ◉ Sharing | ◉ Sync Comments | ◉ Grade | ◉ Transcript | ◉ Archive |
| 🔼 | test 1 (02.28.11) instructions | Exam : test 1 (02.05.11 12:35 pm) | 0 | Educator only | 0 | 0 | upload | 0 |
| 🔼 | test 2 (02.28.11) instructions | Exam : test 2 (02.06.11 09:19 am) | 0 | Educator only | 0 | 0 | upload | 0 |
| start exam | test 3 (02.28.11) instructions | | | | | | | |
| start exam | test 4 (02.28.11) instructions | | | | | | | |

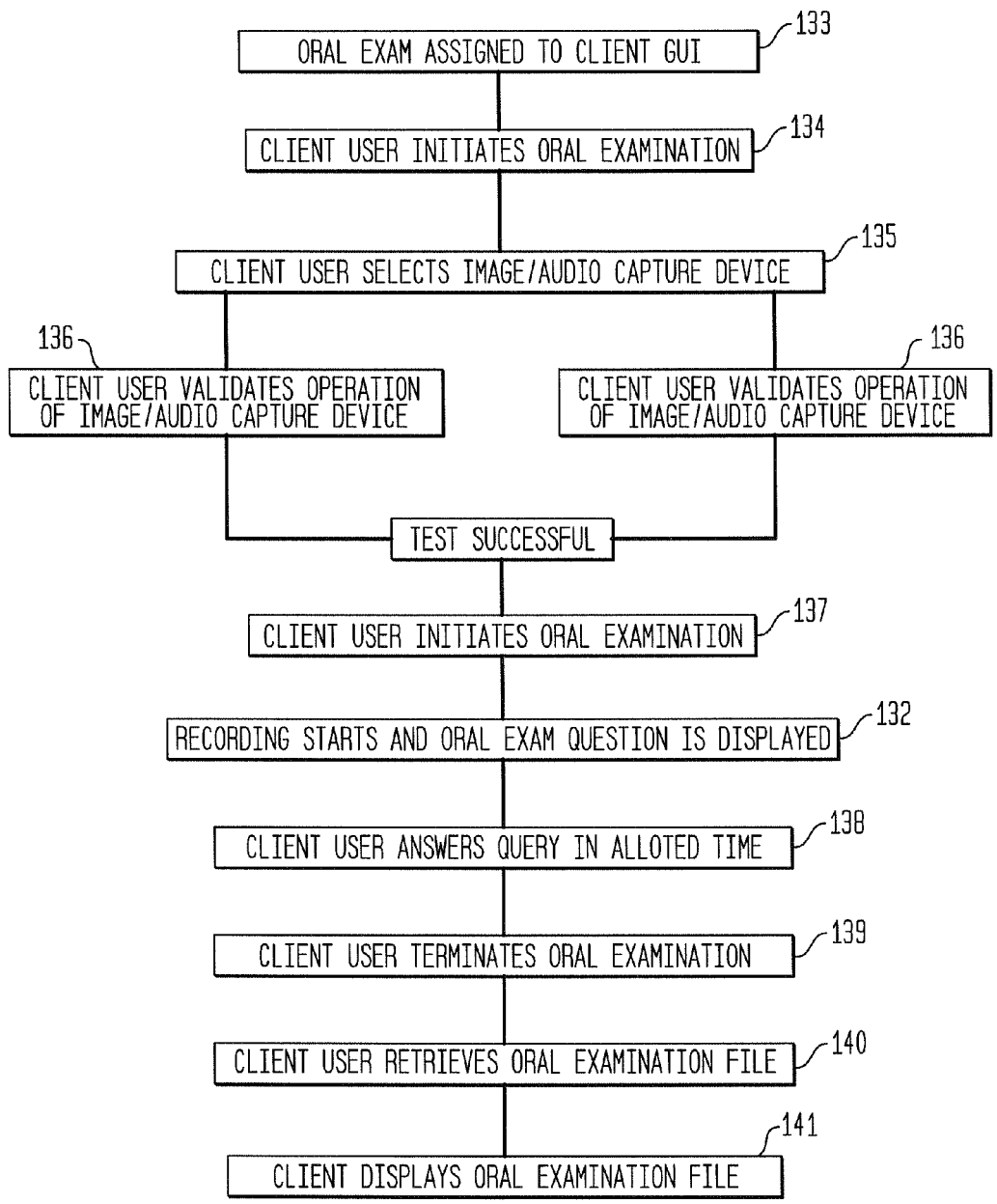

INTERACTIVE ORAL PRESENTATION DISPLAY SYSTEM

This application is the United States National Stage of International Patent Corporation Treaty Patent Application No. PCT/US2011/001820, filed Oct. 27, 2011, which claims the benefit of U.S. Provisional Patent Application No. 61/407,548, filed Oct. 28, 2010, and U.S. Provisional Patent Application No. 61/441,670, filed Feb. 11, 2011, each hereby incorporated by reference herein.

I. TECHNICAL FIELD

Generally, a computer implemented interactive oral presentation display system which provides server computers that allow one or more client devices and one or more administrator devices access to an oral presentation display application which provides client user interfaces having a first image display area and a second image display area concurrently displayed on a display surface allowing the client user to control presentation of streaming media such as a video image in the first image display area and selection of one or more images for serial display in the second image display area, each of which can be coupled in timed synchronized relation with the streaming media. The oral presentation display application further provides administrator user interfaces having a first image display area and a second image display area concurrently display on a display surface allowing the administrator user to control presentation of the streaming media in the first image display area and in synchronized timed relation the one or more images serially

II. BACKGROUND

Historically, the quality of displayed Internet or web based streaming media or video has been compromised due to low resolution of the images. In the context of recorded oral presentations in which the lecturer uses support media such as slides, chart, tables, graphs, or the like, the image of the support media may not be sufficiently resolved for the viewer to read. This may be especially true when the lecturer is in the foreground and the support media is presented in the background.

Currently, there does not exist a computer implemented system which allows the streaming media or video of the oral presentation to be displayed in a first image area on a display surface and the support media or media images to be presented in synchronized timed relation to the oral presentation in a second image area on a display surface to increase clarity of the support media.

Additionally, there does not exist a computer implemented system which allows a person viewing the streaming media or video representing the oral presentation and support media to make comments or annotate the streaming media in manner which synchronizes the comments or annotations in timed relation to the relevant portions, parts, or elements of the streaming media. Typically, comments or annotations in evaluation of a streaming media which include oral presentation and the support media are made in gross, after the fact and generally asynchronous to the relevant portions, parts, or elements of the oral presentation Moreover, The College Opportunity and Affordability Act includes under Part H-Program Integrity SEC. 495. Recognition of Accrediting Agency or Association that "(ii) the agency or association requires an institution that offers distance education or correspondence education to have processes through which the institution establishes that the student who registers in a distance education or correspondence education course or program is the same student who receives the academic credit.

Currently, in the context of distance learning, there does not exist a computer implemented system to assist in the identity verification process and gap assessment of student knowledge. Understandably, if there is no identity verification process to assure that the person who takes an examination is registered for class then gap assessment cannot be achieved with any certainty for the particular subject matter. Comparison of student images is one way to achieve identity verification.

The instant invention addresses each of these concerns with respect to conventional technology.

III. DISCLOSURE OF INVENTION

Accordingly, a broad object of the invention can be to provide a computer implemented presentation display system which includes a client user interface and an administrator user interface each providing a video image display area and a media image display area concurrently displayed on a graphical display surface which allows display of streaming media, representing as one example an oral presentation, in the video image display area concurrent with display of one or more media images, representing for example support media used to support an oral presentation, in the media image display area which allows the media supporting an oral presentation to be viewed with greater clarity.

Another broad object of the invention can be to provide a computer implemented presentation display system which includes a client user interface having a video image display area and a media image display area concurrently displayed on a graphical display surface which allows display of streaming media, representing as one example an oral presentation, and allows synchronization of media images displayed in the media image display area in timed relation to the streaming media displayed in the video image display area such that on re-presentation of the streaming media in the video image display area the media images are presented in the media image display area in serially ordered synchronized timed relation to the streaming media.

Another broad object of the invention can be to provide a computer implemented presentation display system which includes an administrator user interface having a video image display area and a media image display area concurrently displayed on a graphical display surface which allows display of streaming media, representing as one example an oral presentation, in the video image display area and which allows display of media images, representing the media supporting the oral presentation, in the media image display area in synchronized timed relation and further provides an annotation display area in which an administrator user can provide one or more annotation images in synchronized timed relation to the to the streaming media displayed in the video image display area and the synchronized media images displayed in the media image display area, such that on re-presentation of the streaming media in the video image display area and the media images in the media image display area the one or more annotation images are displayed in the annotation display area in serially ordered synchronized timed relation to the display of the streaming media and media images.

Another broad object of the invention can be to provide a computer implemented presentation display system which provides a client user interface having a video image display area in which streaming media, representing as one example an oral presentation, can be displayed and query image display area in which one or more query images can be serially displayed, allowing the response made by the client user to the query image to be recorded in synchronized timed relation such that upon re-presentation of the streaming media in the video image display area including client user's answer to the one or more query images and the one or more query images are displayed in the query display area in serially ordered synchronized timed relation.

Another broad object of the invention can be to provide a computer and an associated display device programmed to implant the client user interface and the administrator user interface, as above described.

Another broad object of the invention can be to provide a computer-readable medium having computer-executable instructions for implementing the client user interface and the administrator user interface in conjunction with the display device having a graphical display surface.

Naturally, further objects of the invention are disclosed throughout other areas of the specification and drawings.

IV. BRIEF DESCRIPTION OF THE DRAWINGS

Figure 3:
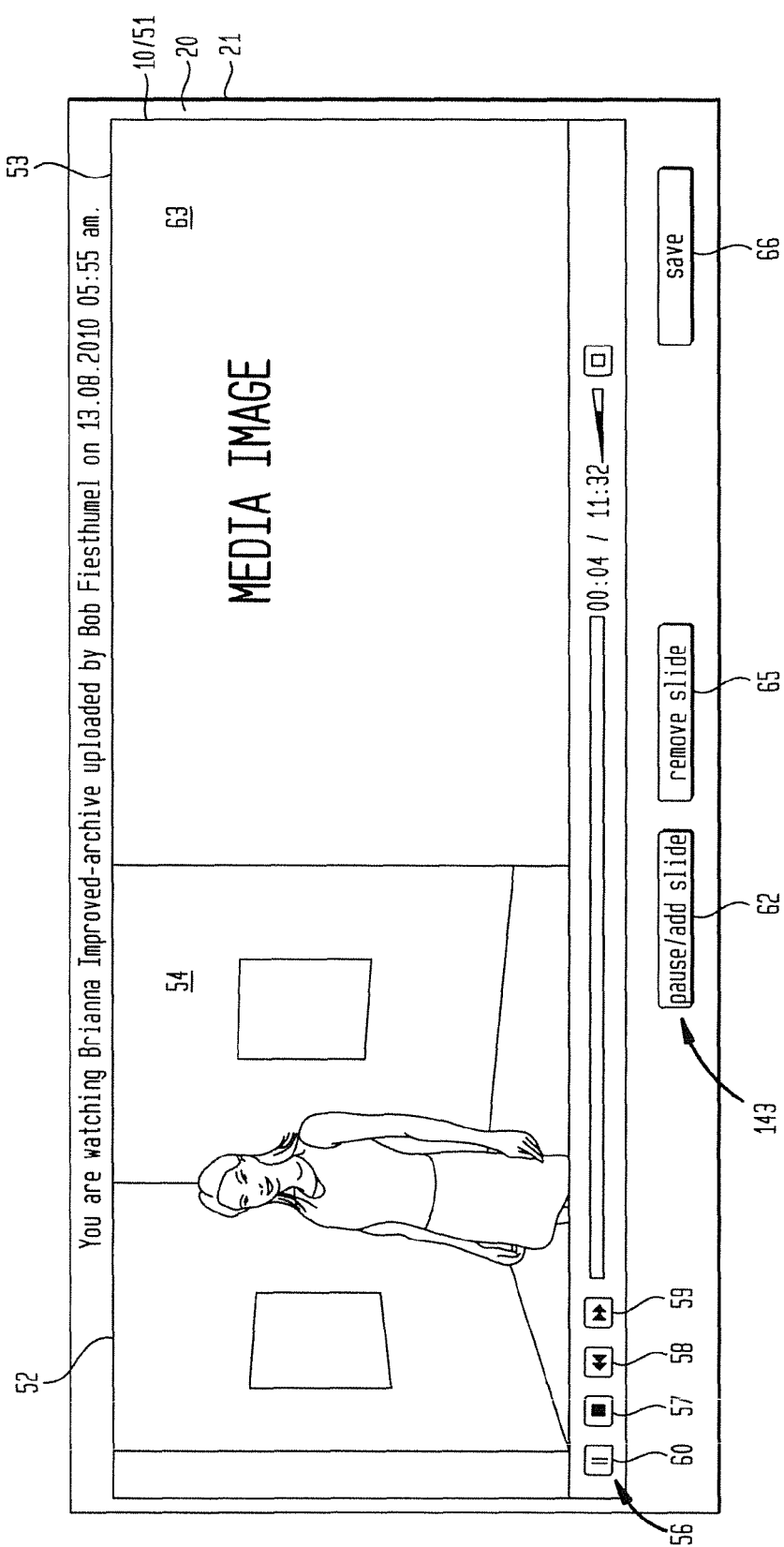

FIG. 3 shows a particular embodiment of a first client graphic user interface which illustrates a common data format for displaying a video image area concurrently with a still image area on a graphical display surface which allows interaction by a client user to synchronize serial presentation of a plurality of still images in the still image area with a video image displayed in the video image area.

Figure 4:
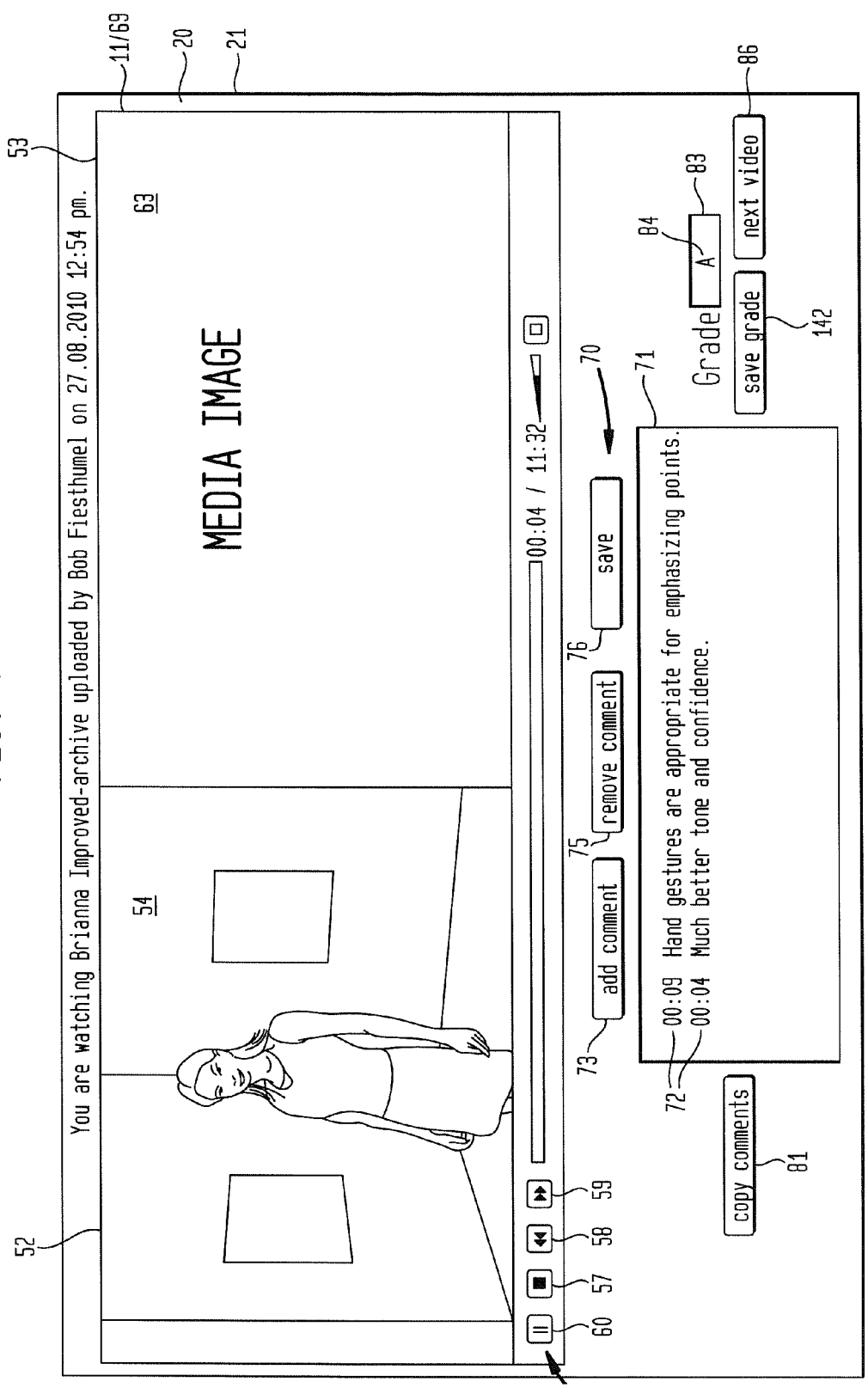

FIG. 4 shows a particular embodiment of a administrator graphic user interface which illustrates a common data format for concurrently displaying a video image area concurrently with a still image area and an annotation image area on a graphical display surface which allows interaction by an administrator to record one or more annotations in the annotation image area in timed synchronization to the serial presentation of a plurality of still images in the still image area with a video image displayed in the video image area.

Figure 5:
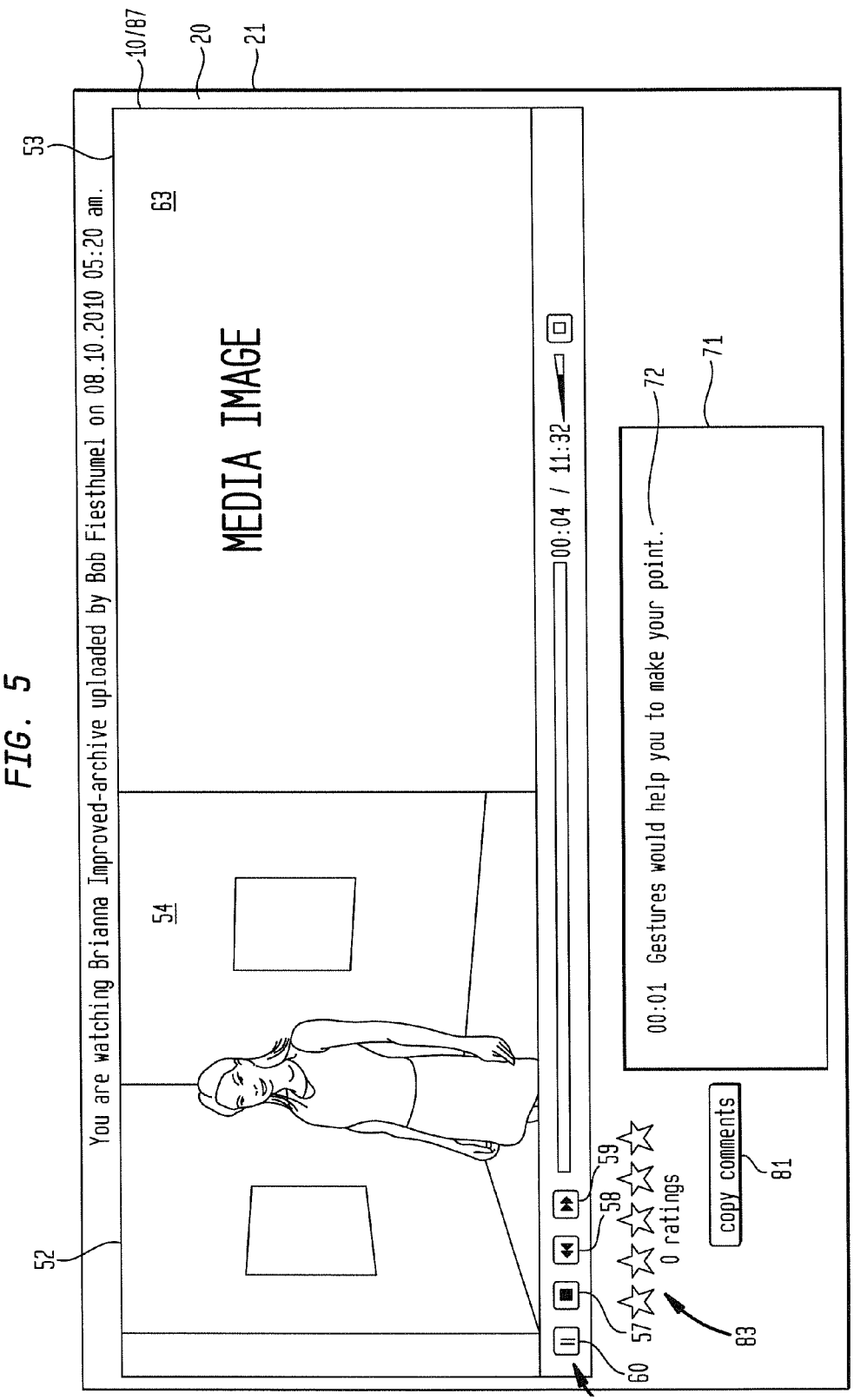

FIG. 5 shows a shows a particular embodiment of a second client graphic user interface which illustrates a common data format for concurrently displaying a video image area concurrently with a still image area and an annotation image area on a graphical display surface which allows interaction by client user to view the one or more annotations in the annotation image area having timed synchronization to the serial presentation of a plurality of still images in the still image area with a video image displayed in the video image area.

Figure 1:
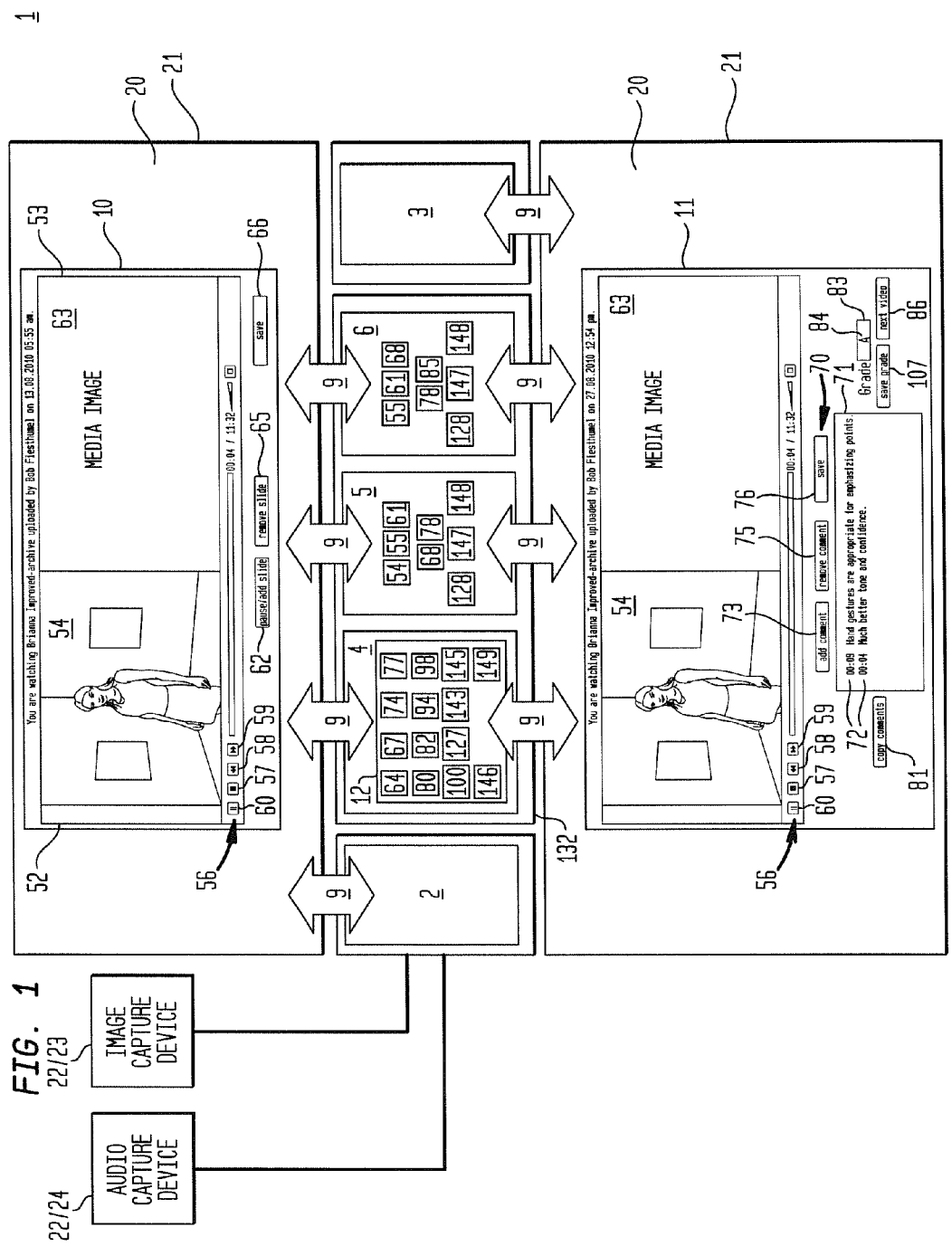
FIG. 1 is a block diagram of an interactive oral presentation system.
Figure 6:
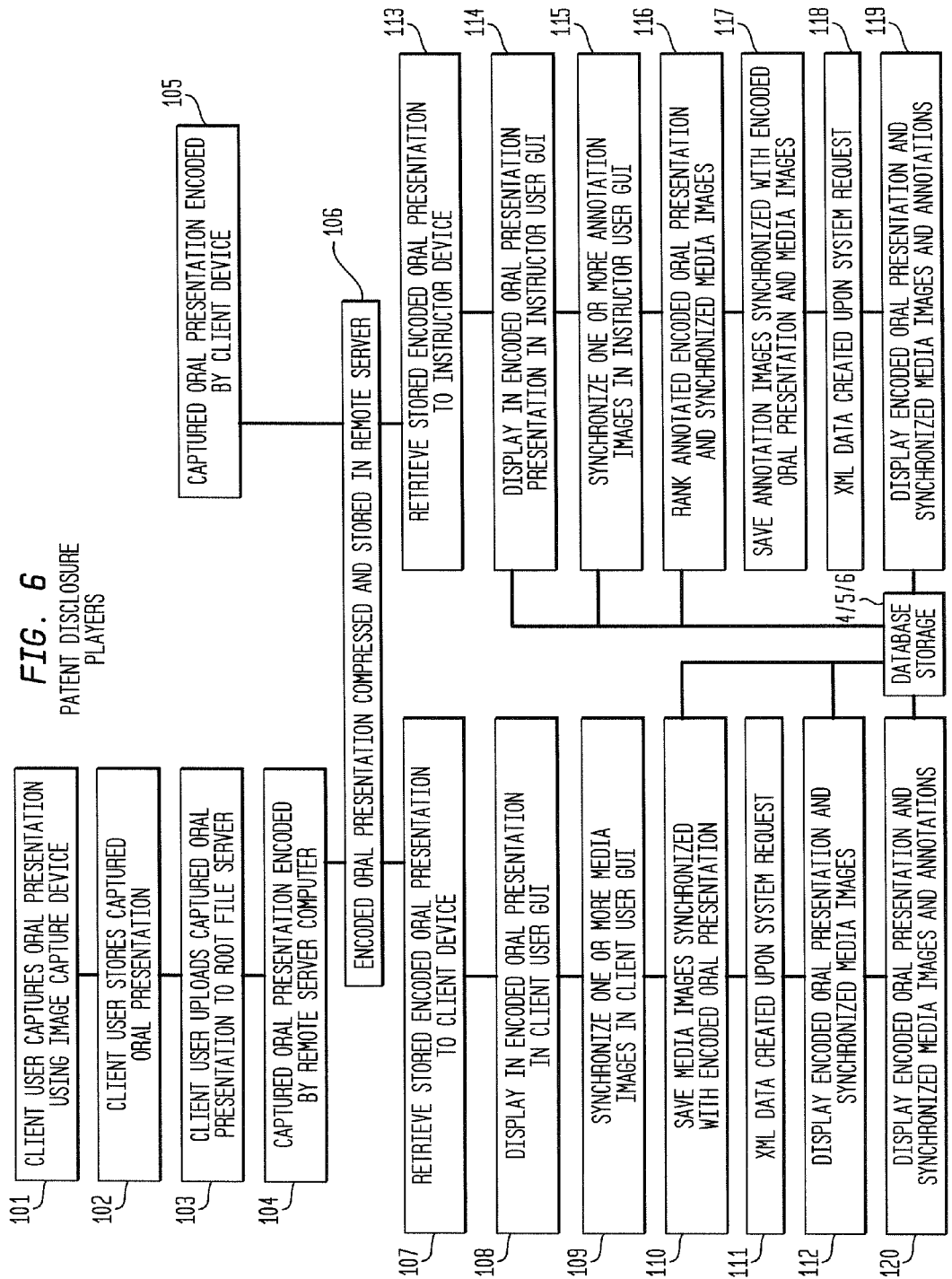

FIG. 6 is a block diagram of a particular method of using the interactive oral presentation display system of shown in FIG. 1.

FIG. 7 shows a particular embodiment of a client graphic user interface which illustrates a data format for displaying oral examination assignments which allows interaction by a client user to select an oral examination.

Figure 8:
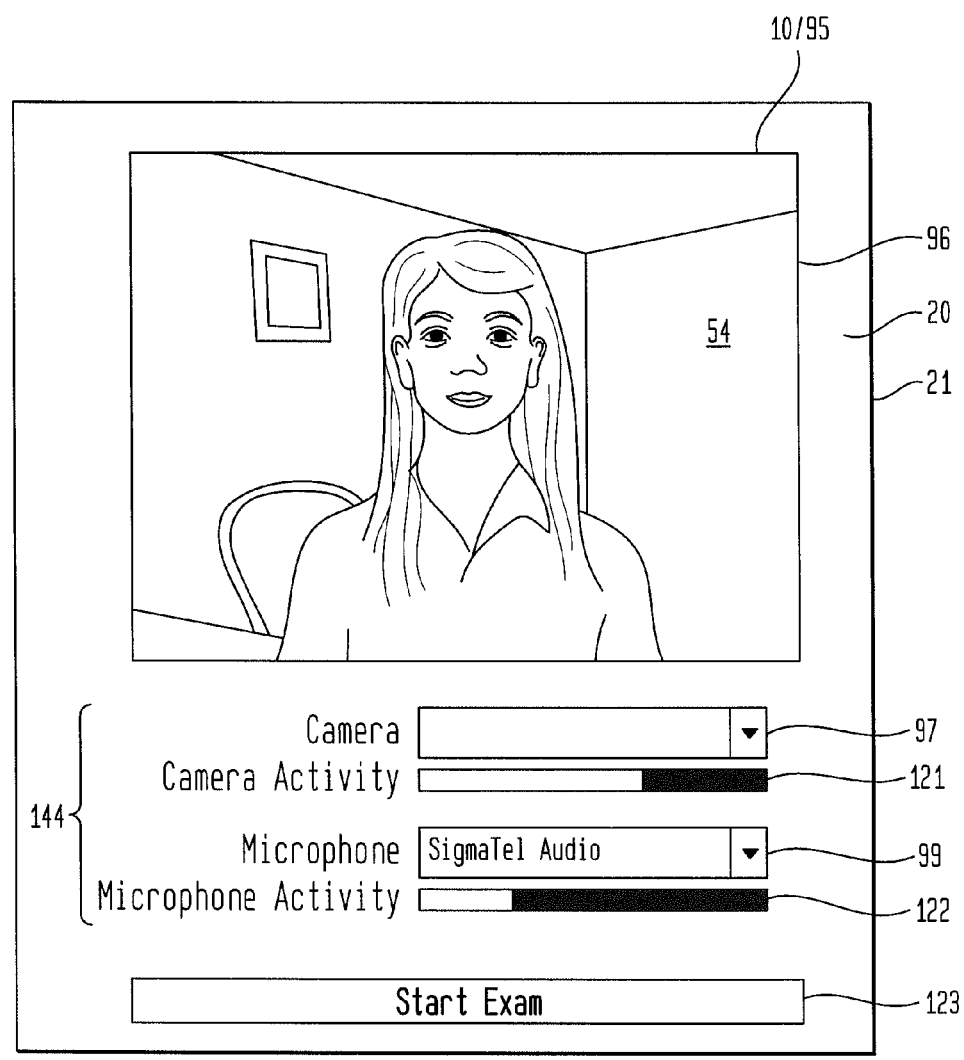

FIG. 8 shows a particular embodiment of a second client graphic user interface which illustrates a data format for displaying an oral examination image area allowing interaction by a client user to assess proper operation of a camera and initiate the oral examination.

Figure 9:
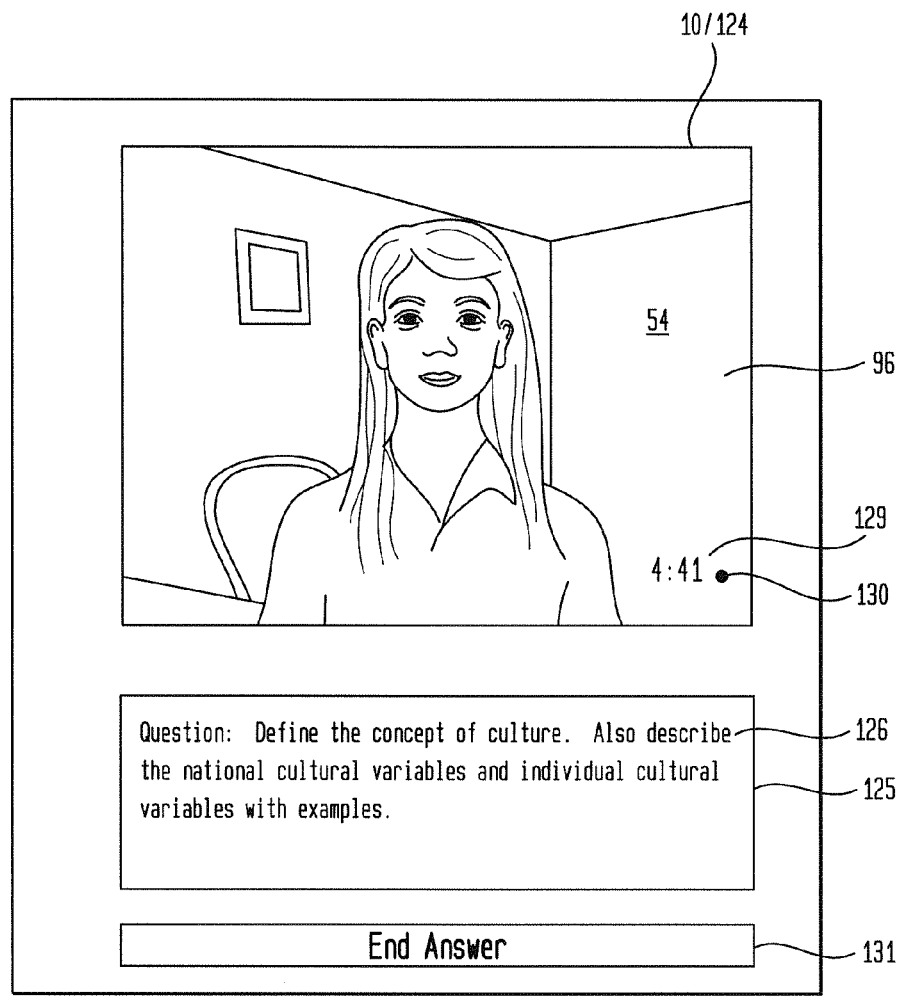

FIG. 9 shows a particular embodiment of third client graphic user interface which illustrates a data format for displaying an oral examination image area concurrently with an query image area for serial presentation of a plurality of query images which allowing interaction by a client user to provide a corresponding oral query answers.

FIG. 10 is a block diagram of a particular method of using the interactive oral examination system shown in FIGS. 7 through 9.

V. MODE(S) FOR CARRYING OUT THE INVENTION

Figure 2:
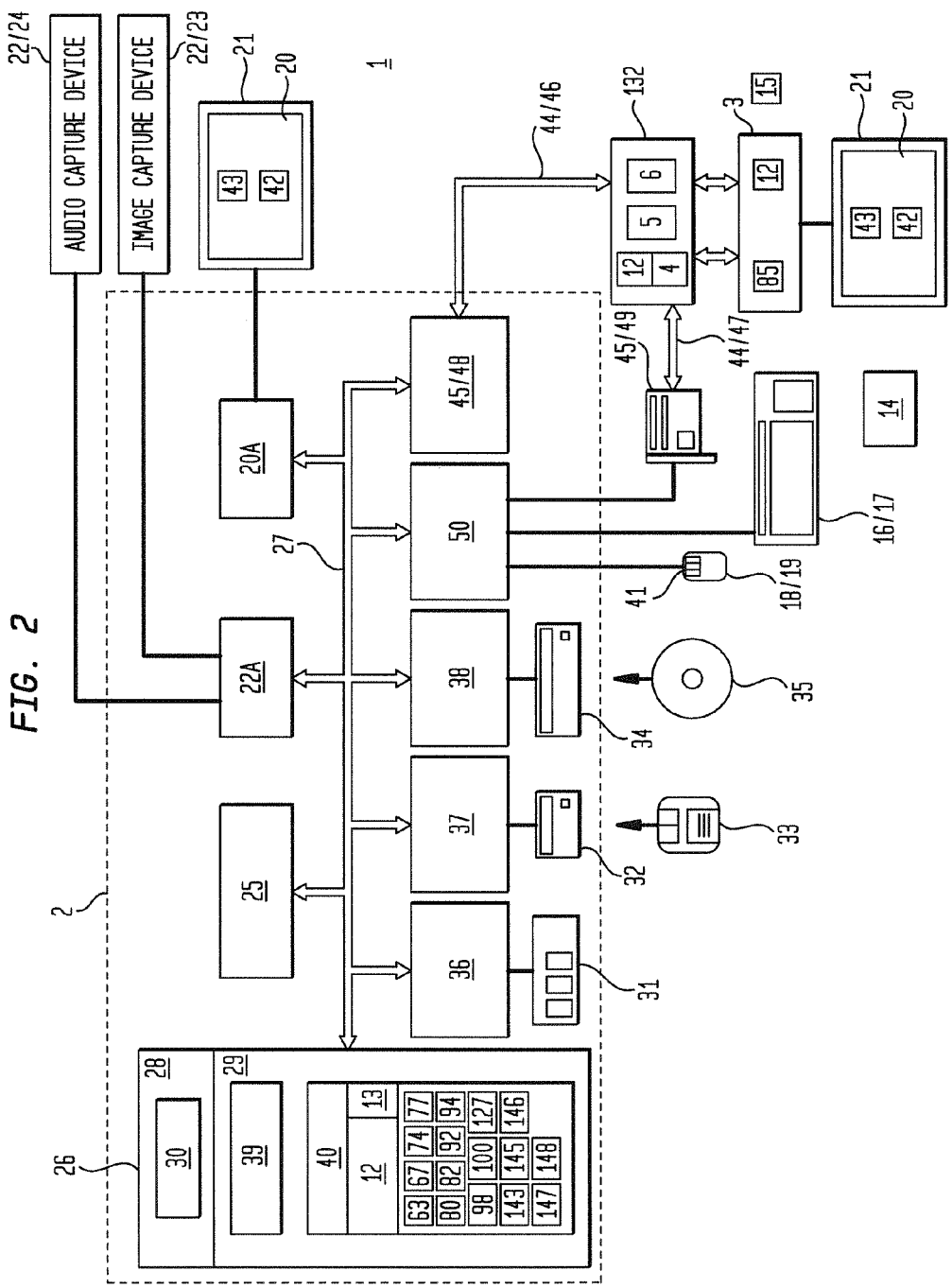
FIG. 2 is a block diagram of an illustrative computer means, network means and computer readable medium which provides computer-executable instructions to provide an embodiment of the interactive oral presentation system.

Now referring primarily to FIGS. 1 and 2, which generally illustrate computer means, certain network means, and computer readable media which can be utilized to practice embodiments of the inventive interactive oral presentation display system (1). It is not intended that embodiments of the invention be practiced in only wide area computing environments or only in local computing environments, but rather the invention can be practiced in local computing environments or in distributed computing environments where functions or tasks are performed by remote processing devices that are linked through a communications network. In a distributed computing environment, program modules may be located in both a local or in a remote memory storage device(s) or device elements.

Also while a preferred embodiment of the invention is described in the general context of computer-executable instructions such as an application program and program modules which utilize routines, programs, objects, components, data structures, or the like, to perform particular functions or tasks or implement particular abstract data types, or the like, being executed by the computer means and network means, it is not intended that any embodiments of the invention be limited to a particular set of computer-executable instructions or protocols.

Now referring to primarily to FIG. 1, one or more client devices (2) and one or more administrator devices (3) can each be configured to connect with one or more server computers (4)(5)(6) (also referred to as "a first server computer (4)" and "a second server computer (5)" and "a third server computer" (6)) through a wide area network (7)("WAN"), such as the Internet (132), or one or more local area networks (8) to transfer corresponding data and images (9). The one or more client devices (2) and the one or more administrator devices (3) can as to particular embodiments take the form of one or more corresponding limited-capability computers designed specifically for navigation on the World Wide Web of the Internet (132). Alternatively, the one or more client devices (2) or the one more administrator devices (3) might be set-top boxes, intelligent televisions connected to receive data through an entertainment medium such as a cable television network or a digital satellite broadcast, hand-held devices such as smart phones, slate or pad computers, personal digital assistants or camera/cell phones, or multiprocessor systems, microprocessor-based or programmable consumer electronics, network PCs, minicomputers, mainframe computers, or the like.

Now referring primarily to FIGS. 1 and 2, in general, each of the one or more client devices (2) and the one or more administrator devices (3) can include an Internet browser (13) (also referred to as a "browser") such as Microsoft's INTERNET EXPLORER®, GOOGLE CHROME™, MOZILLA®, FIREFOX®, or the like, which functions to download and render multimedia content that is formatted in "hypertext markup language" (HTML). In this environment, a first server computer (4) might be programmed to implement the most significant portions of one or more client user interface(s) (10) or administrator user interfaces (11). As to these embodiments, the application program (12) (also referred to as the "interactive oral presentation display program") which implements the one or more client user interface(s) (10) and the one or more administrator user interfaces (11) can be resident in the first server computer (4)(as shown in the example of FIG. 1) and the one or more client devices (2) and the one or more administrator devices (3) can use the browser (13) to display downloaded content and to relay user inputs back to the first server computer (4). The first server computer (4) would respond by formatting new screen displays for the respective client user interfaces (10) (as shown in the examples of FIG. 3 (a first client user interface (51), FIG. 5 (a second client user interface (87), FIG. 7 (a third client user interface (88), FIG. 8 (a fourth client user interface (95), and FIG. 9 (a fifth client user interface (124)) and the respective administrator user interfaces (11) (as shown in the example of FIG. 4 (a first administrator interface (69)) and downloading them for display on one or more of the client devices (2) or one or more administrator devices (3).

In other embodiments, the one or more server computers (4)(5)(6) can be used primarily as sources of data or images (9), with primary responsibility for implementing the client user interfaces (10) and the administrator user interfaces (11) being placed upon each of the one or more client devices (2) or each one of the administrator devices (3). As to these embodiments, each of the one or more client devices (2) and each of the one or more administrator devices (3) can run the appropriate portions of the application program (12) implementing the client user interfaces (10) and the administrator user interfaces (11), as further described below.

In a preferred embodiment of the interactive oral presentation display system (1), a first server computer (4) can be used primarily to store and serve the corresponding portions of the oral presentation display program (12) to the one or more client devices (2) and the one or more administrator devices (3) with the primary responsibility for implementing the client user interface(s) (10) and the administrator user interfaces (11) being placed upon each of the one or more client devices (2) or each of the one or more of the administrator devices (3). Each of the one or more client devices (2) and each one more administrator devices (3) run the appropriate portions of the application program (12) to implement the client user interfaces (10) and the administrator user interfaces (11). A second server computer (5) can be used primarily to record video media (54) (such as streaming video, progressive video, or the like) (also referred to as a "video image"), conversion of video media to video media files (55) in the appropriate format (such as video file formats), and transfer of the files to a third server computer (6). The third server computer (6) can receive, store and retrieve video media files (55). Understandably a greater or fewer server computers can be utilized as necessary or desired. The interactive oral presentation display program (12) operates to provide the video media files (55) and data and images (9) from the one or more server computers (4)(5)(6) in a common format which can be displayed in the client user interfaces (10) or the administrator user interfaces (11).

A client user (14) or an administrator user (15) may enter commands and information into a corresponding one or more client devices (2) or administrator devices (3) through input devices (16) such as a keyboard (17) or a pointing device (18) such as a mouse (19); however, any method or device that converts user action into commands and information can be utilized including, but not limited to: a microphone, joystick, game pad, touch screen, or the like. A display surface (20), such as the graphical display surface, provided by a monitor screen or other type of display device (21) can also be connected to the client device (2) or the administrator device (3) by display interface (20A) (such as a video adapter). The client user interface (10) and the administrator user interface (11) can in part or whole be presented as an interactive graphic interface on the graphical display surface (20). In addition, each of the one or more client devices (2) or the one or more administrator devices (3) can further include peripheral input devices (22) such as an image capture device (23), for example a camera, video camera, web camera, mobile phone camera, video phone, or the like, and an audio capture device (24) such as microphones, speaker phones, computer microphones, or the like. The audio capture device (24) can be provided separately from or integral with the image capture device (23). The image capture device (23) and the audio capture device can be connected to the client user device (2) or the administrator device (3) by an image capture and an audio capture interface (22A).

Now referring primarily to FIG. 2, as a non-limiting example, a client device (2) (encompassed by broken line) can include a processing unit (25), one or more memory elements (26), and a bus (27) (which operably couples components of the client device (2), including without limitation the memory elements (26) to the processing unit (25). The processing unit (25) can comprise one central-processing unit (CPU), or a plurality of processing units which operate in parallel to process digital information. The bus (27) may be any of several types of bus configurations including a memory bus or memory controller, a peripheral bus, and a local bus using any of a variety of bus architectures. The memory element (26) can without limitation be a read only memory (ROM) (28) or a random access memory (RAM) (29), or both. A basic input/output system (BIOS) (30), containing routines that assist transfer of data between the components of the client device (2), such as during start-up, can be stored in ROM (28). The client device (2) can further include a hard disk drive (31) for reading from and writing to a hard disk (not shown), a magnetic disk drive (32) for reading from or writing to a removable magnetic disk (33), and an optical disk drive (34) for reading from or writing to a removable optical disk (35) such as a CD ROM or other optical media. The hard disk drive (31), magnetic disk drive (32), and optical disk drive (34) can be connected to the bus (27) by a hard disk drive interface (36), a magnetic disk drive interface (37), and an optical disk drive interface (38), respectively. The drives and their associated computer-readable media provide nonvolatile storage of computer-readable instructions, data structures, program modules and other data for the client device (2). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules may be stored on the hard disk drive (31), magnetic disk (33), optical disk (35), ROM (28), or RAM (29), including an operating system (39), one or a plurality of application programs (40) and without limitation the interactive oral presentation program (12)(to the extent not stored in a remote server computer (4)) which implements the client user interface(s) (10) and the administrator user interface(s) (11) or other program interfaces.

A "click event" occurs when the client user (14) or the administrator user (15) operates a application function through the use of a command, for example, pressing or releasing the left mouse button (41) while a pointer icon (42) is located over a control icon (43) (or other interactive field which activates a function) displayed in any one of the client user interfaces (10), or administrator user interfaces (11). However, it is not intended that a "click event" be limited to the press and release of the left mouse button (41) on a mouse (19) while a pointer (42) is located over a control icon (43) (or field), rather, a "click event" is intended to broadly encompass a command by the user (14)(15) through which a function of the interactive oral presentation display program (12) (or other program, application, module or the like) which implements the client user interface (10) or the administrator user interface (11) can be activated or performed, whether through selection of one or a plurality of control icon(s) (43) or fields, or by user voice command, keyboard stroke, mouse button, or otherwise. It is further intended that the control icons (43) can be configured or displayed without limitation as a bullets, point, a circle, a triangle, a square, a polygon (or other geometric configurations or combinations or permutations thereof), or as fields or boundary elements created in displayed images, or as fields in which addresses such as a street address, zip code, county code, or natural area code, or inputting a latitude/ longitude or projected coordinate X and Y, or other notation, script or character, or the like, can be entered manually or by operation of the interactive oral presentation display program (12), or a portion or element thereof.

The one or more client devices (2) and the one or more administrator devices (3) can operate in a networked environment using one or more logical connections (44) to transfer data and images (9) and to connect to one or more of server computers (4)(5)(6). These logical connections (44) are achieved by one or more communication devices (45) coupled to or a part of the one or more client devices (2) or the one or more administrator devices (3); however, the invention is not limited to a particular type of communications device (45). The logical connections (44) depicted in FIG. 2 can include a local-area network (LAN) (46) or a wide-area network (WAN) (47). Such networking environments are commonplace in offices, enterprise-wide computer networks, intranets, wireless networks, global satellite networks, cellular phone networks and the Internet (132).

When used in a LAN-networking environment, the client device (2) and the administrator device (3) can be connected to the local area network through a network interface (48), which is one type of communications device (45). When used in a WAN-networking environment, the client device (2) and the administrator device (3) typically each include a modem (49), a type of communications device (45), or any other type of communications device for establishing communications over the wide area network, such as the Internet (132). The modem (49), which may be internal or external, can be connected to the bus (27) via a serial port interface (50). In a networked environment, program modules depicted relative to the client device (2) or the administrator device (3), or portions thereof, may be stored in the one or more server computers (4)(5)(6), as above described. It is appreciated that the network connections shown are exemplary and other means of and communications devices for establishing a communications link between the client devices (2), the administrator devices (3) and the server computers (4)(5)(6) can be used.

Now referring again primarily to FIGS. 1 and 2, the client device (2) and the administrator device (3) can encompass a single computer or can encompass a plurality of computers each of which can be operated by a corresponding user (14)(15) which can be without limitation a person or a plurality of persons whether individually, serially or as a group. The user (14)(15) can access to the interactive oral presentation display application (12) including the corresponding one or more client user interfaces (10) or the one or more administrator user interfaces (11) to retrieve data and images (9) from one or more server computers (4)(5)(6) in a common format for display on the graphical display surface (20).

Now referring to FIG. 3, which provides an example of a first client user interface (51), in accordance with the invention. The first client user interface (51) can be implemented using various technologies and different devices, depending on the preferences of the designer and the particular efficiencies desired for a given circumstance. By click event the client user (14) can activate the interactive oral presentation display application program (12) which in part functions to display the first client user interface (51). The first client user interface (51) includes in part a video image display area (52) and a media image display area (53) concurrently adjacently or proximally displayed on the graphical display surface (20).

The client user (14) can utilize an image capture device (23) and further utilize an audio capture device (24) whether integral or separate from the client device (2) to capture an oral presentation as video media (54) which can be recorded and converted to an appropriate video media file (55) in the appropriate format and retrievably stored by the client device (2), or can be recorded and converted to the appropriate file format by a second server computer (5) and the video media file (55) transferred for retrievable storage to a third server computer (6) (shown in the example of FIG. 1); however, the invention is not so limited and a fewer or greater number of computer servers (4)(5)(6) can be utilized in conjunction with the client device (2). The client user (14) can by click event activate the application program (12) to retrieve a video media file (55) from the client device (2) or from one or more server computers (4)(5)(6) for display in the video image display area (52).

The first client user interface (51) can further include a video image presentation controller (56) which includes a start control (57) which by click event commences presentation of the video media (54) in the video image display area (52), a rewind control (58) which by click event allows re-presentation of a portion of the video media (54), a fast forward control (59) which by click event increases the rate at which the video media (54) is presented in the video image display area (52), and a pause control (60) which by click event pauses presentation of video media (54) in the video image display area (52).

The client user (14) can further retrievably save one or more image files (61) (such .jpg, .jpeg, .gif, .bmp, .png files, video files, or otherwise) in the client device (2) or in one or more computer servers (4)(5)(6) (as shown in the example of FIG. 1). The application program (12) can further display proximate the video image display area (52) and the media image display area (53) an image synchronizer (143) providing media image selection control (62) which can be in the form of a image synchronizer icon (shown as "pause/add slide icon" in the example of FIG. 3) which by click event activates an image synchronizer module (64) of the application program (12) which functions to pause presentation of the video media (54) in the video image display area (52) and further allows the user to selectively retrieve from the client device (2) or any one of the computer servers (4)(5)(6) (or other server) a media image file (61). Upon retrieval of the media image file (61), the image synchronizer module (64) further functions to display a media image (63) which can be still images, such as photographs, drawings, graphs, charts, slide images, or the like, or video images, video clips, or the like, in the media image area (53) on the display surface (20). The image synchronizer module (64) can further function to couple presentation of the media image (63) in the media image area (53) in synchronized timed relation to presentation of the video media (54) in the video image display area (52). The client user can by click event of the start control (57) recommence presentation of the video media (54) in the video image display area (52) of the display surface (25). The client user (14) can by click event activate the image synchronizer module (64) one or a plurality of times during presentation of the video media (54) in the video image display area (52) to correspondingly display a plurality of media images (63) in the media image display area (53) each thereby coupled in synchronized timed relation to the video media (54) by operation of the image synchronizer module (64). The term "synchronized time relation" means for the purpose of this invention that the presentation of the media image (63)(or serial presentation of a plurality of media images (63)) in the media image display area (53) is coordinated in timed relation to the presentation, and each subsequent re-presentation, of the video media (54) in the video image display area (52). The one or more media images (63) can be time stamped in relation to the video media (54) such that upon retrieval of the video media file (55) the media images (63) are also retrieved such that presentation of the video media in the video image display area (52) can be accompanied by presentation of the one or more media images (63) in the media display area (53) in synchronized timed relation as originally determined by the client user (14).

The image synchronizer (143) can further include proximate the video image display area (52) and the media image area (53) an image removal control (65) which can be in the form of an image removal icon (shown as "remove slide" in the example of FIG. 3) which by click event activates the image synchronizer module (64) of the application program (12) to uncouple one or more media images (63) from synchronized timed relation with the video media (54). Understandably, the one or more media images (63) (or different media images (63)) can be re-coupled in synchronized timed relation to the video media (54) by click event of the image synchronizer icon (62), as above described.

The image synchronizer (143) can further include a save control (66) which can be in the form of a save icon which by click event correspondingly activates a save module (67) which functions to save the video media (54) and the time stamped or otherwise coupled media images (63) to the client device (2) or one or more of the server computers (4)(5)(6) as an oral presentation display file (68) which can be retrieved by the client user (14) or the administrator user (15). Upon retrieval of the oral presentation display file (68) by the application program (12), the video media is presented in the video image display area (52) on the display surface (20), and in synchronized timed relation, based on time stamp or similar matching or retrieval element, the one or more media images (63) can be presented in serial order in the media image display area (53). The client user (14) can add or remove media images (63), as above-described, and by click event of the save control (66)(save icon) activate the save module (67) to update and save the oral presentation display file (68).

Now referring primarily to FIG. 4, which provides an example of a first administrator user interface (69), in accordance with the invention. The first administrator user interface (69) can be implemented using various technologies and different devices, depending on the preferences of the designer and the particular efficiencies desired for a given circumstance. By click event the administrator user (15) can activate the interactive oral presentation display application program (12) which in part functions to display the first administrator user interface (69). The administrator user interface (69) includes in part a video image display area (52) and a media image area (53) concurrently adjacently or proximally displayed on the display surface (20), which can be similar in structure and function to that above described for the first client user interface (51). The administrator user (15) can by click event activate the application program (12) to retrieve an oral presentation display file (68) from the administrator device (3) or from one or more server computers (4)(5)(6). The content contained by the oral presentation display file (68) can be displayed as video media (54) in the video image display area (52) and in synchronized timed relation, one or more media images (63) can be presented in the media image display area (53). The first administrator user interface (69) can further include a video image presentation controller (56) which functions as above described by click event of the start control (57), a rewind control (58), a fast forward control (59), and a pause control (60) which can function as above described.

The application program (12) can further display on the display surface (20) proximate the video image display area (52) and the media image area (53) a presentation annotation controller (70) (also referred to as an "annotation synchronizer") which includes an annotation image display area (71) in which one or more annotation images (72) can be established by click event on an annotation icon (73) (shown as an "add comment" icon in the example of FIG. 4). The annotation icon (73) by click event activates an annotation synchronization module (74) which functions to pause the presentation of video media (54) and the presentation of media images (63) to allow the administrator user (15) to enter one or more annotation images (72) in the annotation image display area (71). The annotation synchronization module (74) further functions to couple the annotation image (72) in synchronized timed relation to the video media (54) displayed in the video presentation area (52) and the media image (63) presented in the media image display area (53). The administrator user (15) can by click event of the start control (57) recommence presentation of the video media (54) in the video image display area (52) and the presentation of media images (63) in the media image area (53) of the display surface (20). The administrator user (15) can by click event activate the annotation synchronizer module (74) one or a plurality of times during presentation of the video media (54) in the video image display area (52) to correspondingly establish a plurality of annotation images (72) in the annotation image display area (71) each coupled in synchronized timed relation to the streaming media (54) by operation of the annotation synchronizer module (64) (for example, the annotation images (72) can each be time stamped based on the time the streaming media was paused by activation of the annotation synchronizer module (74)).

The application program (12) can further include proximate the video image display area (52) and the media image area (53) an annotation removal control (75) which can be in the form of an annotation removal icon (75) (shown as "remove comment" in the example of FIG. 4) which by click event activates the annotation synchronizer module (74) of the application program (12) to uncouple the one or more annotation images (72) from synchronized timed relation with the video media (54) and the media images (63). Understandably, the one or more annotation images (72) can be re-coupled to the video media (54) in synchronized timed relation by click event of the annotation synchronizer icon (73), as above described.

The presentation annotation controller (70) can further include a save control (76) which can be in the form of an save annotation icon (76) which by click event correspondingly activates a save annotation module (77) which functions to save the video media (54) and the time stamped or otherwise coupled annotation images (72) to the administrator device (3) or one or more of the server computers (4)(5)(6) as an annotated oral presentation display file (78) which can be retrieved by the client user (14) or the administrator user (15). Upon retrieval of the an annotated oral presentation display file (78) by the application program (12), the video media (54) can be presented in the video image display area (52) on the display surface (20), and in synchronized time relation based on time stamp, the one or more media images (63) are presented in serial order in the media image display area (53), and in synchronized timed relation based on time stamp, the one or more annotation images (72) are presented in serial order in the annotation image display area (71) on the display surface (20). The client user (14) can add or remove annotation images (72), as above-described, and by click event of the save control (76)(save annotation icon (76) activate the save annotation module (77) to update and save the annotated oral presentation display file (78). The application (12) can further provide a copy annotations module (80) which can be activated by click event of a copy control (81) which can be in the form of a copy annotations icon (shown as "copy comments" in the example of FIG. 4).

The application program (12) can further include an oral presentation valuation module (82) which includes a value element display area (83) (proximate "grade" in the example of FIG. 4). The administrator user (15) can enter a value element image (84) (such as a letter grade A, B, C or the like, or numerical value 1, 2, 3, 4 or the like, or a word such as excellent, average, poor or the like, or one or more symbols such as a five star rating system) in the value element display area (83). The value element image (84) can be associated with the annotated oral presentation display file (78) and saved to the administrator device (3), or the one or more of the server computers (4)(5)(6) by use of a save value element control (142) which can be in the form of a save value element icon (shown as the "save grade" icon in FIG. 4). As to particular embodiments, the oral presentation valuation module (82) can further function upon click event to export the value element image (84) to a comma separate values sheet such as a spreadsheet. As to particular embodiments, a plurality of oral presentation display files (68) can be held in serial order a queue (85) and by click event on next file control (86) which can be in the form of a next file icon (show as "next video" in the example of FIG. 4) the oral presentation valuation module (82) can display the contents of the next oral presentation display file (68) in the administrator user interface (15), as above described.

Now referring primarily to FIG. 5, which provides an example of a second client user interface (87), in accordance with the invention. The second client user interface (87) can be implemented using various technologies and different devices, depending on the preferences of the designer and the particular efficiencies desired for a given circumstance. By click event the client user (14) can activate the interactive oral presentation display application program (12) which in part functions to display the second client user interface (87). The second client user interface (87) includes in part a video image display area (52) and a media image area (53) concurrently adjacently or proximally displayed on the display surface (20), similar to that above described for the first client user interface (51) and the first administrator interface (69). The client user (14) can by click event activate the application program (12) to retrieve an annotated oral presentation display file (78) from the administrator device (3), from the administrator device (3), or from one or more server computers (4)(5)(6). The content contained by the an annotated oral presentation display file (78) can be displayed as video media (54) in a video image display area (52) and in synchronized timed relation, one or more media images (63) presented in the still image display area (53). The second user interface (87) can further include a video image presentation controller (56) which functions as above described by click event of a start control (57), a rewind control (58), a fast forward control (59), and a pause control (60).

The application program (12) can further display on the display surface (20) proximate the video image display area (52) and the media image area (53) an annotation image display area (71) in which one or more annotation images (72) are displayed in synchronized timed relation to presentation of the video media (54) in the video image display area (53) allowing the client user (14) to review the annotation images (72) made by the administrator user (15). The copy annotations module (80) can be activated by click event of a copy annotations controller (81) which can be in the form of a copy annotations icon (shown as "copy comments" in the example of FIG. 5) allowing the client user (14) to copy one or more of the annotation images (72) to an external file or document.

The oral presentation valuation module (82) which includes a value element display area (83) (shown for example as a one through five star rating system in FIG. 5). Allows the client user (14) to rate the contents of a plurality of an annotated oral presentation display files (78), as above described for the first administrator user interface (69).

Now referring primarily to FIG. 6, which provides a flow diagram of an illustrative method of using a particular embodiment of the interactive oral presentation display system (1), as shown in FIGS. 1 through 5. While the steps of the method are shown in a particular order for the convenience of describing the illustrative method, the invention is not so limited, and the client user (14) or the administrator user (15) can commence or terminate the method at any step at any step, or utilize only a portion of the steps, or utilize the steps out of order, depending upon the circumstances. Additionally, the client user (14) and the administrator user (15) can utilize the corresponding first client user interface (51), or the second user interface (87), or the first administrator interface (69) concurrently or asynchronously.

In a step (101) in accordance with the invention, the client user (14) can capture an oral presentation as video media (54) by use of an image capture device (23), as above described. In a further step (102), the client user (14) can store the video media (54) in a memory (26) of the client device (2). In a further step (103), the client user (14) can upload the video media (54) which in a further step (104) can be transferred to the second server computer (5) for encoding in common file format compatible with the first client user interface (51), the first administrator interface (69), and the second client user interface (87) as a streaming media file (55). As an alternative to steps (103) through (104), in a step (105), the interactive oral presentation display system (1) by operation of the application program (12) can encode the video media (54) using the client device (2) as a video media file (55) in a common format which can be presented in the video image display (52) on the display surface (20) of the client device (2) or the administrator device (3). In a step (106), the video media file (55) can be compressed and retrievably stored in the third computer server (6). In a further step (107), the client user (14), or in a further step (113), the administrator user (15), can retrieve the video media file (55) to display on the client device (2) or the administrator device (3) using the first client user interface (51) or the first administrator user interface (69), respectively.

Typically, the client user (14) in a further step (108) displays the contents of the video media file (55) using the first client user interface (51) in the video image display area (53) on the display surface of the client device (2) using the video image presentation controller (56). In a further step (109), the client user (14) synchronizes one or more media images (63) by click event of the image synchronizer (143) using the image synchronizer icon (62) to activate the image synchronizer module (64), as above described. In a further step (110), the client user (14) by click event on the save icon (66) saves the one or more media images (63) in synchronized timed relation to the video media (54) as an oral presentation display file (68) in the third computer server (6). In a further step (111) XML data can be generated. In a further step (112), the oral presentation display file (68) can be retrieved and viewed by the client user (14) using the first client user interface (51) with the video media (54) presented in the video image display area (52), and in synchronized timed relation, the one or more media images (63) can be presented in the media image display area (53) on the display surface (25) of the client device (2).

The administrator user (15), in a further step (114), can display the oral presentation display file (68) on the administrator device (3) using the first administrator user interface with the (69) the video media (54) displayed in the video image display area (52) in synchronized timed relation to the one or more media images (63) displayed in the media image display area (53). In a further step (115) the administrator user (15) can synchronize one or more annotation images (72) in the annotation image display area (71) by click event of the annotation synchronizer icon (73). In a further step (116), the administrator user (15) ranks the content of the annotated oral presentation display file (78) by establishing a value element image (84) in the value element display area (83). In a further step (117), the administrator user (15) can by click event use the save annotation icon (76) to save an annotated oral presentation display file (78) to the third server computer (13). In a further step (118), XML data can be generated. In a further step (119), the annotated oral presentation display file (78) can be retrieved by the administrator user (15) for re-display using the first administrator user interface (69) which displays the one or more annotation images (72) in the annotation image display area (71) and the one or more images (63) in the media image display area (53) in synchronized timed relation to display of the video media (54) displayed in the video display area (53).

Typically, in further step (120), the client user (14) utilizing the second client user interface (87) retrieves the annotated oral presentation display file (78) for re-display using the second client user interface (87) which displays the one or more annotation images (72) in the annotation image display area (71) and the one or more images (63) in the media image display area (53) in synchronized timed relation to display of the video media (54) displayed in the video display area (53).

Now referring primarily to FIG. 7, embodiments of the interactive oral presentation display system (1) can provide a third client user interface (88) which can be used separate from or in conjunction with the above described elements of the interactive oral presentation display system (1). The third client user interface (88) can provide a client assignment display area (89) in which assignment information images (90) (shown as "test 3" or "test 4" in the example of FIG. 7) can be displayed. The assignment information images (90) can provide for example assignment due dates or test due dates along with and instruction link elements (91) which upon click event activate a instruction module (92) which allows the client user (14) to assess instructions relating to the assignment or oral examination due by the assignment due date or oral examination due date. The third client user interface (88) can further provide an oral examination control (93) in the form of one or more exam icons (each shown as a "start exam" link in the example of FIG. 7) each relating to an oral examination which by click event activates an oral examination module (94) of the application program (12).

Now referring primarily to FIG. 8, the oral examination module (94) functions in part to display a fourth client user interface (95) which provides an oral examination image display area (96) on the display surface (20) of the display device (21) of the client device (2). Video media (54) captured by one or more image capture devices (23), as above described, can be displayed in the oral examination image display area (96)(typically, the video media (54) displayed in the oral examination image display area (96) is that of the client user (14) testing operating parameters of the image capture device (23) and the audio capture device (24)). The fourth user interface (95) further provides an oral examination image control (144) which can include an image capture device selector (97) which can be the form of a image capture device selection icon for a drop down list (shown as "camera" in the example of FIG. 8) which by click event activates an image capture selection device module (98) which allows the client user (14) to select one of a plurality of image capture devices (23). Similarly, the oral examination image control (144) can further provide an audio capture device selector (99) which can be in the form of a audio capture device selection icon for a drop list (shown as a "microphone" in the example of FIG. 8) which by click event activates an audio capture selection device module (100) which allows the client user (14) to select one of a plurality of audio capture devices (24), as above described. The fourth client user interface (95) can further provide an image capture activity indicator (121) (shown as a horizontal field and image capture activity indicia in the example of FIG. 9) and an audio capture activity indicator (122) (shown as a horizontal field and audio capture activity indicia in the example of FIG. 9). The fourth client user interface (95) can further provide an oral examination initiation control (123) which can be in the form of an initiate oral examination icon (123)(shown as a "start exam" icon in the example of FIG. 8) which by click event activates the oral examination module (94) which in turn generates a fifth client user interface (124), an example of which is shown in FIG. 9.

Now referring primarily to FIG. 9, the fifth client user interface (124) retains the oral examination image display area (96) on the display surface (25) of the client device (2) and continues to display the video media (54) captured by the selected image capture device (24)(shown as the client user (14) taking an oral examination in FIG. 9). The fifth client user interface (124) further includes a query image display area (125) in which one or more query images (126) can be generated in serial order by operation of the oral examination module (94). Upon presentation of each query image (126) in the query image area (125), the oral examination module (96) activates a recording module (127) which records the captured video media (54) (both image and audio) including the client user's (14) answer to the query image (126) to an oral examination file (128). The oral examination file (128) can be stored in the client device (2) and encoded and converted to a common file format and stored either by the client device (2) or by the one or more server computers (4)(5)(6), as above described. The oral examination module (94) can upon presentation of each query image (126) generate a timer image (129) in the oral examination image display area (96) (shown as a digital timer in the example of FIG. 9) which allots and counts down a period of time in which the client user (14) can provide an answer to the query image (126). A recording indicator (130) can be generated proximate the timer image (129) to indicate to the client user (14) that the video media (54) is being recorded. The fifth client user interface (124) can further include an oral examination termination control (131) which can be in the form of a terminate oral examination icon (shown as "end answer" in the example of FIG. 9) which upon click event activates the oral examination module (94) to terminate recording of the video media (54) for the query image (126). The oral examination module (94) can further function to display the next query image (126), reset the timer image (129) to allocate and count down a period of time in which the client user (14) can answer the displayed query image (126), as above described. Upon elapse of the period of time in which the client user (14) can answer the last of the one or more inquiry images (126), the oral examination module (94) can further function to turn off the image capture device (23) and the audio capture device (24). The oral examination module (94) can further function to display a submission control (132) (shown as thumbnail in the example of FIG. 7) to the client user (14) and provide an instruction link element (91) in the third client user interface (88). The client user (14) can be directed from the fifth client user interface (124) to the third client user interface (88) to obtain the instructions by click event on the instruction link element (91).

The interactive oral presentation display system (1) can further include a user verification module (145) which interacts with the image capture device (23) to capture one or more user images (146) from the video media (54) displayed in the video image display area (52) or the video media (54) displayed in the oral examination image display area (96). The one or more user images (146) can be compared by function of the user verification module (145) with a plurality of user verification images (147) obtained from a user verification image database (148) to identity of said one or more user images with said user verification images enables said oral examination initiation control allowing interaction with said user.

Now referring primarily to FIG. 10, which provides a flow diagram of an illustrative method of using a particular embodiment of the interactive oral presentation display system (1) shown in FIGS. 7 through 9. While the steps of the method are shown in a particular order for the convenience of describing the illustrative method, the invention is not so limited, and the client user (14) can commence or terminate the method at any step, or utilize only a portion of the steps, or utilize the steps out of order, depending upon the circumstances. Additionally, the client user (14) can utilize the corresponding first client user interface (51), or the second user interface (87), or the first administrator interface (69) concurrently or asynchronously.

In a step (133) in accordance with the invention, an administrator user (15) can display one or more assignment information images (90) in the client assignment display area (89) of the third client user interface (88). In a further step (134) the client user (14) can select an exam icon (93) (shown as "start exam" in the example of FIG. 7) by click event to activate the instruction module (92) which displays the fourth client user interface (95). In a further step (135), the client user (14) selects by click event of the image capture device selection ion (97) and the audio capture device selection icon (99) an image capture device (23) and an audio capture device (24), respectively. In a further step (136) the client user (14) validates that the activity of the image capture device (23) and the audio capture device (24) by viewing the image capture activity indicator (121) and the audio capture activity indicator (122). If the validation fails, the client user (14) can repeat step (135) to select another image capture device (23) or audio capture device (24). Upon successful validation, in a further step (137), the client user (14) can by click event of the initiate oral examination icon (123) activate the oral examination module (98) which functions to display the fifth client user interface (124), display the first query image (126) in the query image area (125), allocate time in which the client user (14) can provide an answer to the query image (126), generates a timer image (29) and activates the recording module (127) which provides recording indicator (130) to record the answer of the client user (14). In a further step (138), the client user (14) orally answers the query image (126). In a further step (139), the client user (14) terminates the oral examination by click event of the terminate oral examination icon (131). In a further step (140), the client user (140) retrieves the oral examination file (128) which can be displayed in the fifth client user interface (124) with the streaming media (54) presented in the oral examination image display area (96) and the query images (126) presented in the query image area (125) with the query images (126) presented in synchronized timed relation to the streaming media (54) of the client user (14) answering the query images (126).

As can be easily understood from the foregoing, the basic concepts of the present invention may be embodied in a variety of ways. The invention involves numerous and varied embodiments of an interactive oral presentation display system and methods making and using an interactive display for oral presentation.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a user interface" should be understood to encompass disclosure of the act of "using an interface"—whether explicitly discussed or not—and, conversely, were there effectively disclosure of the act of "using an interface", such a disclosure should be understood to encompass disclosure of "a user interface" and even a "means for using an interface." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus the applicant(s) should be understood to claim at least: i) an interactive oral presentation display system as herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this international PCT patent specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A user interface for depiction on a graphical display surface, comprising:
    a video image display area displaying a video image;
    a media image display area displaying a media image in synchronized timed relation to said video image;
    an annotation image display area displaying annotations relating to said video image and said media image, each of said video display area, said media display area, and said annotation image display area concurrently displayed on said graphical display surface by operation of a processor communicatively coupled to a memory element containing computer executable instructions to implement said user interface; and
    an annotation controller displayed on said graphical display surface by operation of an annotation synchronizer, said annotation controller having an annotation add icon which by user interaction pauses display of said video image in said video image display area and pauses display of said media image in said media image display area to allow user entry of said annotations directly into said annotation image display area, and wherein said annotation synchronizer in response to entry of said annotations into said annotation image display area causes said annotation image to be coupled in synchronized timed relation with said video image displayed in said video image area and said media image displayed in said media image display area at a pause time of said video image.

2. The user interface of claim 1, further comprising an image synchronizer which allows a user to synchronize in timed relation each of one or more media images displayed on said media image area of said graphical display surface with a video image concurrently displayed on said video image display area of said graphical display surface.

3. The user interface of claim 1, wherein said image synchronizer further comprises a media image selection control which allows said user to pause display of said video image on said video image display area and select said media image for display on said media image display area, and wherein display of said media image on said media image display area couples in synchronized time relation said media image with said video image at a pause time if said video image, thereby synchronizing concurrent display of said media image in said media image display area with said video image displayed on said video image display area at said pause time.

4. The user interface of claim 3, wherein said image synchronizer further comprises a media image removal control which allows said user to remove said media image from display on said media image display area, thereby uncoupling synchronized timed relation display of said media image in said media image display area with said video image displayed in said video image display area to said pause time of said video image.

5. The user interface of claim 4, wherein said image synchronizer further comprises a save control which allows said user to store in a memory element said media image displayed in said media image display area in coupled synchronized timed relation with said video image displayed in said video image display area.

6. The user interface of claim 1, wherein said annotation controller further includes an annotation removal icon which allows said user to remove one or more of said annotations directly from display on said annotation display area, thereby uncoupling in synchronized time relation said annotation entered on said annotation image display area to said video image displayed on said video image area and said media image displayed on said media image display area to said pause time of said video image.

7. The user interface of claim 6, wherein said annotation controller further includes an annotation save icon which allows said user to store in a memory element said annotations displayed in said annotation display area in coupled synchronized timed relation with said video image displayed in said video image display area and said one or more media images displayed on said media image area.

8. A non-transitory computer-readable medium having computer-executable instructions for performing a method, comprising:
displaying a video image in a video image display area on a graphical display surface;
displaying a media image in synchronized timed relation to said video image in a media image display area on said graphical display surface;
displaying annotations relating to said video image and said media image an annotation image display area on said graphical display surface, each of said video display area, said media display area, and said annotation image display area concurrently displayed on said graphical display surface: and
displaying an annotation controller on said graphical display surface by operation of an annotation synchronizer, said annotation controller having an annotation addition icon which by user interaction pauses display of said video image in said video image display area and pauses display of said media image in said media image display area to allow user entry of said annotations directly into said annotation image display area, and wherein response to entry of said annotations into said annotation image display area, said annotation synchronizer causes said annotation image to be coupled in synchronized timed relation with said video image displayed in said video image area and said media image displayed in said media image display area at a pause time of said video image.

9. The method of claim 8, further comprising:
pausing said video image in said video image display area by interaction of a user with said media image selection control of said image synchronizer; and
removing said media image displayed in said media image display area by interaction of a user with a media image removal control, thereby uncoupling synchronized timed relation display of said media image in said media image display area with said video image displayed in said video image display area to said pause time of said video image.

10. The method of claim 8, further comprising saving to a memory element in coupled synchronized timed relation said video image displayed in said video image area with said media image displayed in said media image display area.

11. The method of claim 10, further comprising:
obtaining from said memory element said video image and said media image in coupled synchronized timed relation;
displaying said video image in said video image area; and
concurrently displaying said media image in said media image display area, said media image displayed in synchronized timed relation to display of said video image.

12. The method of claim 8, further comprising:
pausing display of said video image on said video image area and display of said media image on said media image area by user interaction with annotation removal icon of said annotation controller; and
removing one or more of said annotations on said annotation area by user interaction with an annotation removal icon, thereby uncoupling in synchronized timed relation said annotations images entered on said annotation image display area to said video image displayed on said video image area and said media image displayed on said media image display area.

13. The method of claim 12, further comprising saving into a memory element said video image displayed in said video image area and said media image displayed on said media image area in coupled synchronized timed relation with said annotations displayed in said annotation display area.

14. The method of claim 13, further comprising the step of:
obtaining from said one or more server computers said video image, said media image, and said one or more annotations in coupled synchronized time relation;
displaying said video image in said video image display area;
concurrently displaying said media image in said media image display area; and
concurrently displaying said annotations in said annotation image display area; and
synchronizing in timed relation the concurrent display of said video image on said video image display area, said media image on said media image display area, and said annotations on said annotation display area.

15. A visual information evaluation system, comprising:
one or more client devices each having an associated graphical display surface, each said client device having a client user interface to concurrently display a video image area and a media image area on said graphical display surface, each said client device further programmed to display a video image in said video image display area concurrent with display of one or more media images in said media image display area, each said client device further programmed to concurrently display on said graphical display surface an image synchronizer which by user interaction synchronizes in time relation display of each of said one or more media images on said media image display area of said graphical display surface with content of a video image concurrently displayed on said video image area of said graphical display surface; and one or more administrator devices each having an associated graphical display surface, each said administrator device having an administrator user interface to concurrently display a video image display area and a media image display area on said graphical display surface, each said administrator device further programmed to display a video image on said video image display area with one or more media images on said media image display area synchronized by use of one of said client devices, each said administrator device further programmed to concurrently display on said graphical display surface an annotation controller having an annotation addition icon which by user interaction pauses display of said video image in said video image display area and pauses display of said one or more media images in said media image display area to allow user entry of said annotations directly into said annotation image display area, and wherein response to entry of said annotations into said annotation image display area, said annotation synchronizer causes said annotations to be coupled in synchronized time relation with said video image displayed in said video image area and said media image displayed in said media image display area at a pause time of said video image.

16. The visual information evaluation system of claim 15, wherein each said client device further programmed to display in synchronized timed relation said video image in said video image area concurrent with said one or more media images in said media image area, said client device further programmed to display in synchronized timed relation said one or more annotation images in said annotation display area synchronized by use of one of said one or more administrator devices.

17. The visual information evaluation system of claim 16, further comprising:
a video capture device which provides said video image, said video image being an oral presentation by a presenter;
a first computer server which retrievably stores in a memory element said video image to provide to said client device on demand.

18. The visual information evaluation system of claim 17, wherein said one or more media images being one or more slide images containing content associated with said oral presentation, and further comprising a second computer server which retrievably stores said one or more slide images provided to said client device on demand.

19. The visual information evaluation system of claim 18, further comprising a computer-readable medium having computer-executable instructions for implementing said client user interface and said administrator user interface in conjunction with a display device having said graphical display surface.

* * * * *